United States Patent [19]

Myojo et al.

[11] Patent Number: 4,871,126
[45] Date of Patent: Oct. 3, 1989

[54] FISHING REEL

[75] Inventors: Seiji Myojo; Jun Sato, both of Sakai, Japan

[73] Assignee: Shimano Industrial Company Limited, Osaka, Japan

[21] Appl. No.: 632,821

[22] Filed: Jul. 20, 1984

[30] Foreign Application Priority Data

Jul. 22, 1983 [JP] Japan .......................... 58-114572[U]

[51] Int. Cl.$^4$ ............................................. A01K 89/00
[52] U.S. Cl. ................................................ 242/84.1 R
[58] Field of Search .................... 242/84.1 R, 84.1 K, 242/84.4, 84.41, 84.42, 84.53, 84.2 R, 84.2 A, 84.5 R, 84.51 R

[56] References Cited

U.S. PATENT DOCUMENTS

| 412,629 | 10/1889 | Kepler | 242/84.1 R |
| 1,565,402 | 12/1925 | Schmid | 242/84.42 |
| 1,996,130 | 4/1935 | Urquhart | 242/84.53 |
| 2,554,411 | 5/1951 | Hull et al. | 242/84.53 |
| 3,108,760 | 10/1963 | Nurmse | 242/84.2 A |

Primary Examiner—John M. Jillions
Attorney, Agent, or Firm—Stevens, Davis, Miller & Mosher

[57] ABSTRACT

A double bearing type fishing reel includes a thumb rest supported between a pair of side frames of a reel body. The thumb rest is large in width and is pivoted to the side frames to be swingable between a first position where the thumb rest is laid down along the outer peripheries of the side frames and a second position where the thumb rest is raised radially outwardly of the side frames to facilitate untangling of the fishing line. The thumb rest is adapted to be held in the first position.

4 Claims, 2 Drawing Sheets

FISHING REEL

FIELD OF THE INVENTION

This invention relates to a fishing reel, and more particularly to a fishing reel which includes a reel body having a pair of side frames and a spool journalled thereto, with a thumb rest being mounted across both the side frames.

BACKGROUND OF THE INVENTION

Conventionally, fishing reels which have a spool journalled to the side frame of the reel body have been known as double bearing reels. In operation, an angler uses a small-sized double bearing reel mounted to a fishing rod, by gripping the reel body together with the fishing rod with his hand handle, whereby the reel body is provided with a thumb rest on which the thumb of his hand gripping the reel body is to be placed.

The thumb rest is mounted across both of the side frames and is usually positioned radially upwardly of the spool and ahead in the direction of drawing out a fishing line therefrom.

In the above-described type of thumb rest, a problem exists in that at the end of casting of the line from the spool in free rotation, the rotational speed of the spool carrying the wound line does not lower speed of the while the line being drawn out lowers, so that the line is drawn out in surplus and becomes tangled in a ring around the pool, i.e. so-called backlash. In this case, the tangled line must be unraveled quickly to be placed again in proper condition, but such disposal may be hindered by the physical position of the thumb rest. Also, for reels which include a level wind mechanism ahead of the spool, the presence of the thumb rest makes it difficult to pass the line through the level wind mechanism. Such problems will become more significant if the thumb rest is larger in width to facilitate placement of the angler's thumb on the rest regardless of the size of his hand. Hence, the conventional thumb rest is made smaller in width, whereby the angler experiences pain in the thumb of his hand gripping the reel body. As a result, he does not grip the reel sufficiently tightly, resulting in an adverse effect on his handle operation for fishing.

SUMMARY OF THE INVENTION

An object of the invention is to provide a fishing reel with a thumb rest which is sufficiently large in width with respect to the angler's thumb and which ensures that he can tightly grip the reel by use of the thumb rest, and wherein the line, even when tangled by the backlash, is easy to unravel without being affected by the thumb rest.

This invention is characterized in that the thumb rest is made larger in width and is pivoted to the side frames to swing between a first position where the thumb rest is laid down along the outer peripheral surfaces of the side frames and a second position where the thumb rest is raised upright with respect to the outer peripheral surfaces of the same, and a holding means is provided for holding the thumb rest in the first position.

Accordingly, since the angler grips the reel together with the rod through the wide thumb rest, can tightly grip the reel without experiencing pain and also the line, even when tangled due to a backlash, can readily be unraveled by pivoting the thumb rest to the second position at which it will not hinder access to the line.

In a case where this invention is applied to a fishing reel provided with a level wind mechanism positioned ahead of the spool relative to the direction in which line is drawn out from the spool, the line can pass through a guide bore at the level wind mechanism without hindrance of the thumb rest.

The thumb rest may be formed of opaque material, but transparent material is available for the thumb rest, to thereby enable supervision of the line in drawing-out condition and the winding condition.

It is preferable for the fishing reel provided with the level wind mechanism to allow the thumb rest in the first position to cover the level wind mechanism. Thus, the thumb rest also serves as a guard for the level wind guide mechanism thereby improving durability thereof.

The above and further objects and novel features of the invention will be more fully apparent from the following detailed description when the same is read in connection with the accompanying drawings.

DETAILED DESCRIPTION OF THE INVENTION

Figure 2:
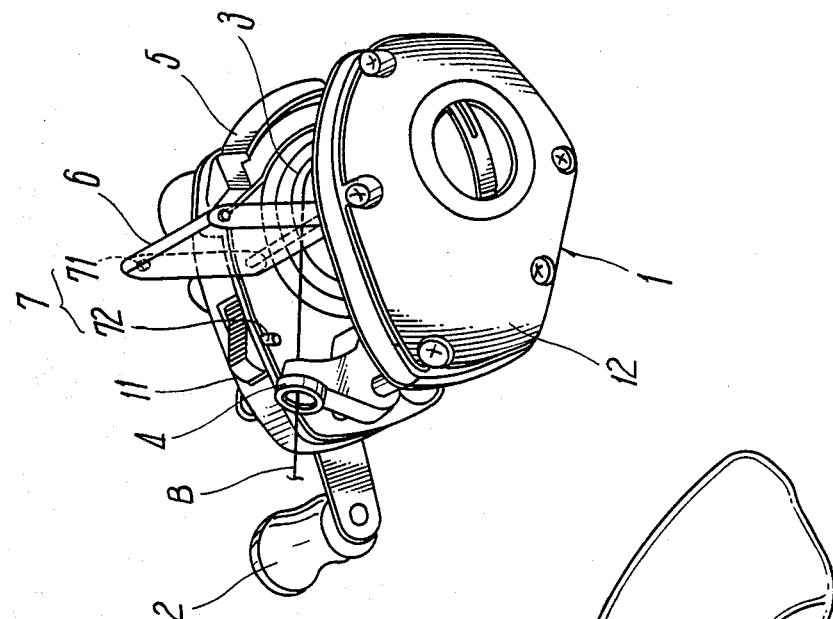
FIG. 2 is a perspective view of the FIG. 1 embodiment, in which the thumb rest is raised to a second position.
Figure 1:
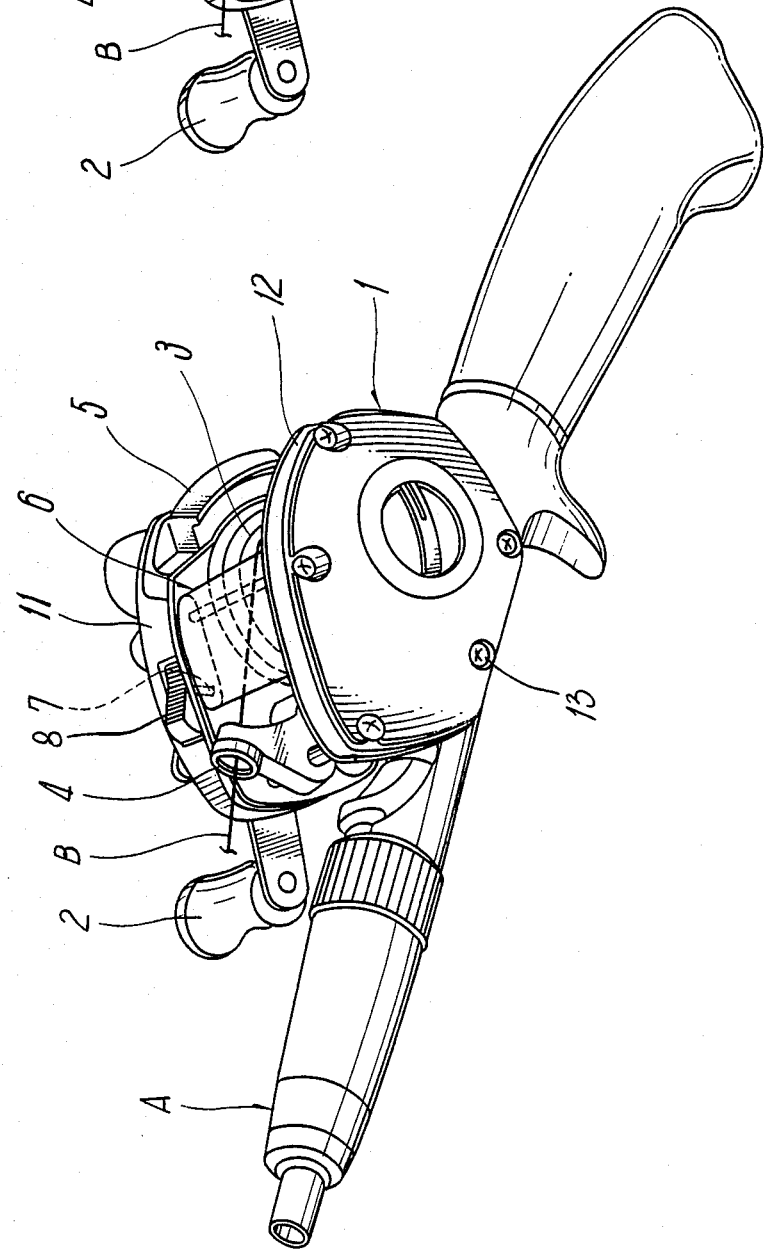
FIG. 1 is a perspective view of an embodiment of a fishing reel of the invention, which is mounted to a fishing rod, with a thumb rest located in a first position.

FIGS. 1 and 2 show the first embodiment of a fishing reel of the invention mounted to a fishing rod A, in which reference numeral 1 designates a reel body having a pair of side frames 11 and 12. A handle 2 is supported rotatably to the outside of one side frame 11, and a spool 3 is journalled to both the side frames 11 and 12. A level wind guide 4 at a level wind mechanism is provided in front of spool 3 in relation of being movable in reciprocation axially by spool 3, so that the handle 2 is operated to drive the spool 3 and reciprocate the level wind guide 4, thereby winding therethrough a fishing line B uniformly onto the spool 3.

Reference numeral 5 designates a clutch operating button which is provided at the upper rear portion of side frame 11 and which can be pushed to disconnect the spool 3 from the handle 2 to keep the spool 3 in a freely rotatable condition. The button 5, when the handle 2 is rotated in the direction of winding the line, is restored to connect the spool 3 and handle 2 with each other. In addition, the angler, after pushing the operating button, shifts his finger onto the spool 3 to retard it by applying thereto a predetermined rotational resistance, thereby permitting normal casting.

A thumb rest 6 is provided across the upper portions of side frames 11 and 12 and at the position where the angler's thumb is placed when he holds by his hand the reel body 1 at the rear portion thereof in an embracing manner.

The thumb rest 6 in the first embodiment is larger in width longitudinally of reel body 1 to an extent of alleviating pain resulting from pressure applied by the angler's thumb, and is positioned between the level wind guide 4 and the clutch operating button 5. Thumb rest 6 is also journalled at the rear portion to the side frames 11 and 12 in relation of being swingable between a first position where the thumb rest 6 is laid down as shown in FIG. 1 and a second position where the same is raised radially outwardly with respect to the outer peripheries of side frames 11 and 12 as shown in FIG. 2. Also, at the side frames 11 and 12 and thumb rest 6 are provided holding means for holding the latter in the first position.

Figure 3:
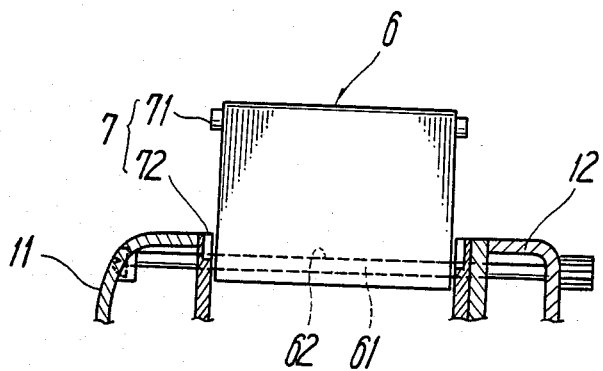
FIGS. 3 through 5 are views explanatory of various embodiments and showing the relation between the thumb rest and a holding means.
Figure 4:
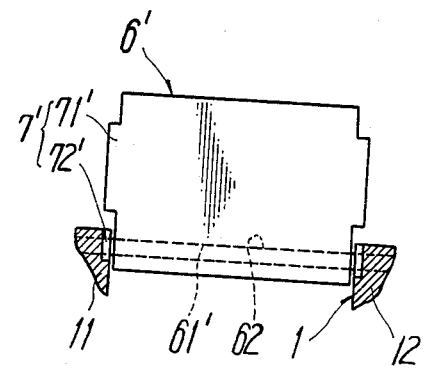

A through bore 61 is provided at the thumb rest 6 and a pivot shaft 62 is inserted into the bore 61 and fixed to the side frames 11 and 12 so that the thumb rest 6 is pivotally supported to the side frames 11 and 12 through the shaft 2 as shown in FIGS. 3 and 4.

The various embodiments of thumb rest 6 shown in FIGS. 1 through 4 each use one of plurality of connecting rods for the side frames 11 and 12 to function as the pivot shaft 62.

Figure 5:
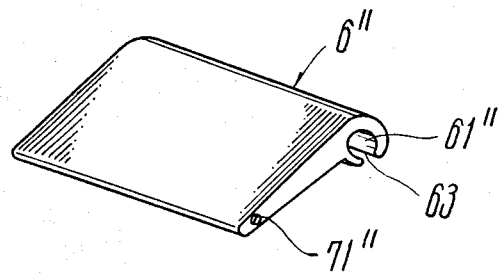

Alternatively, the through bore 61" may, as shown in FIG. 5, be cut at one side to form a cutout 63 so that the thumb rest 6" may be mounted detachably to the fixed pivot shaft 62 from one side thereof. Also, in a case where the thumb rest 6" is molded of synthetic resin or aluminum alloy, a pair of pivot stems (not shown) may project from both sides of thumb rest 6" and shaft bores may be formed at the side frames 11 and 12 respectively, with the stems engaging with the shaft bores to thereby mount the thumb rest 6" to the side frames 11 and 12.

The thumb rest 6 may be formed of an opaque material, but is preferred to be formed of transparent material of synthetic resin so that the line can be seen therethrough in its drawn-out or wound-up condition, thereby preventing the occurrence of trouble with tangled lines.

Figure 6:
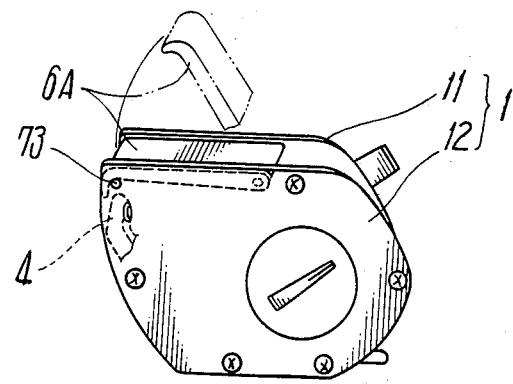
FIG. 6 is a schematic perspective view of another embodiment of the invention.

The holding means 7, as shown in the first embodiment in FIGS. 1 through 3, comprises holding projections 71 at both sides of the free end of thumb rest 6 and retaining grooves 72 provided at the upper edges of opposite surfaces of side frames 11 and 12 and for retaining the projections 71 respectively. The projections 71' at the holding means 7, as shown in FIG. 4, may be elongate widthwise of thumb rest 6'. In this case, the retaining grooves 72' are elongated similarly, or alternatively can be omitted so that the projections 71' are retained to the outer peripheries of side frames 11 and 12 respectively. Furthermore, a holding pin 73 for carrying thereon the free end of thumb rest 6 may be mounted across the side frames 11 and 12 as shown in FIG. 6. Also, the holding means 7 may use magnets (not shown) to further ensure retainment of thumb rest 6.

In addition, in FIGS. 1 and 2, reference numeral 8 designates a button for switching the spool 3 between the reverse rotation and the anti-reverse-rotation.

In the aforesaid construction, when the angler intends to grip the reel body 1 together with the fishing rod A, he lays down the thumb rest 6 along the outer peripheries of side frames 11 and 12 to keep it in the first position by use of the holding means 7. Thus, he can place the thumb on the thumb rest 6 and tightly hold the reel body 1 without feeling a pain in the thumb thanks to the larger width of thumb rest 6.

In a case where the line is tangled by the backlash around the spool 3 as aforementioned, the thumb rest 6 is raised in the second position as shown in FIG. 2, thereby being reduced in width longitudinal by of reel body 1 and spaced a large distance from the level wind guide 4. Hence, the angler can readily unravel the line and restore it in a normal condition.

Also, the thumb rest 6 raised in the second position allows the angler to easily pass the line through the level wind guide 4.

The thumb rest 6 made transparent allows the angler to see through the thumb rest and spot movement of the line to thereby prevent the occurrence of backlash. Also, the thumb rest 6" detachably mounted to the side frames as shown in FIG. 5 is removable from the reel body 1 when the line is tangle, thereby further simplifying correction of trouble.

Alternatively, a thumb rest 6A is extended at its front end and bent to cover the level wind guide 4 as shown in FIG. 6, so that when the angler intends to hold the reel body 1, the thumb of his hand gripping the reel body 1 is prevented from contacting with the level wind guide 4, thereby improving operational safety of the fishing reel. Furthermore, the level wind guide 4 and a transverse groove (not shown) for guiding therethrough the level wind guide 4 during reciprocation, can be protected by the thumb rest 6A from a foreign object flying from the front. Hence, problems such as the level wind guide 4 being broken or flying foreign object entering into the transverse groove and hindering reciprocal movement of level wind guide 4, can be avoided.

In the embodiment in FIG. 6, the holding means for the thumb rest 6A is so constructed that a holding pin 73 is provided across the side frames 11 and 12 and the thumb rest 6A is retained at the front end to the holding pin 73.

Alternatively, the thumb rest 6 may be pivoted at the front end to the side frames 11 and 12 to swing around the rear end.

As seen from the above, the fishing reel of the invention provides the thumb rest larger in width and swingable between the aforesaid first and second positions and the holding means, whereby anyone can place his thumb on the thumb rest to ensure holding of the reel body, and the thumb rest can be rasied to facilitate untangling of the line when entangled by backlash thereof.

Although several embodiments have been described, they are merely exemplary of the invention and not to be construed as limiting, the invention being defined solely by the appended claims.

What is claimed is:

1. A fishing reel, comprising:
   a reel body having a pair of side frames;
   a spool rotatably disposed between said side frames;
   a thumb rest mounted on and between said side frames at said reel body, said thumb rest having a width dimension extending longitudinally along a portion of said reel body and including swinging means disposed at one end of said width dimension of said thumb rest, for swinging said thumb rest between a first position at which said thumb rest is laid down along outer peripheries of said side frames and a second position at which said thumb rest is raised with respect to the outer peripheries of said side frames;
   a holding means for holding said thumb rest in the first position; and
   a level wind guide mechanism for guiding a fishing line, said level wind guide mechanism being positioned ahead of said spool relative to a direction in which a fishing line is drawn out of said spool, said thumb rest being positioned such that when said thumb rest occupies said first position it covers said level wind guide mechanism from above.

2. A fishing reel according to claim 1, wherein said thumb rest is transparent.

3. A fishing reel according to claim 1, wherein said reel body comprises a plurality of connecting rods for connecting said side frames, one of said connecting rods serving as a pivot shaft for pivotally supporting said thumb rest.

4. A fishing reel according to claim 1, wherein said reel body comprises a plurality of connecting rods for connecting said side frames, one said connecting rod which is located at an upper portion of the side frames serves as a pivot shaft for pivotally supporting the thumb rest, and said swinging means operates to swing said thumb rest forwardly on said pivot shaft away from a fisherman when said fishing reel is in position for use.

* * * * *